United States Patent [19]

Shin

[11] Patent Number: 6,101,619
[45] Date of Patent: Aug. 8, 2000

[54] METHOD FOR IMPROVING ACCESS PERFORMANCE ON TRACK WITH RE-ALLOCATION SECTOR IN A HARD DISK DRIVE

[75] Inventor: Suk-Ho Shin, Gumi, Rep. of Korea

[73] Assignee: Samsung Electronics Co., Ltd., Suwon, Rep. of Korea

[21] Appl. No.: 09/001,471

[22] Filed: Dec. 31, 1997

[30] Foreign Application Priority Data

Dec. 31, 1996 [KR] Rep. of Korea ............... 96-82656

[51] Int. Cl.[7] ............................................. G11C 29/00
[52] U.S. Cl. ................... 714/710; 714/765; 714/769; 714/805; 714/42; 369/32; 369/57
[58] Field of Search ................................. 714/710, 765, 714/769, 805, 764, 42, 6, 8, 54, 47; 369/53, 56, 57, 58, 32

[56] References Cited

U.S. PATENT DOCUMENTS

| 4,405,952 | 9/1983 | Slakman | 360/49 |
|---|---|---|---|
| 4,631,723 | 12/1986 | Rathbun et al. | 714/710 |
| 4,706,136 | 11/1987 | Wentzel et al. | 360/39 |
| 4,746,998 | 5/1988 | Robinson et al. | 360/72.1 |
| 4,814,903 | 3/1989 | Kulakowski et al. | 360/59 |
| 4,914,530 | 4/1990 | Graham et al. | 360/48 |
| 5,075,804 | 12/1991 | Deyring | 360/49 |
| 5,202,876 | 4/1993 | Takagi | 369/58 |
| 5,235,585 | 8/1993 | Bish et al. | 369/54 |
| 5,271,018 | 12/1993 | Chan | 714/710 |
| 5,285,436 | 2/1994 | Moribe | 369/58 |
| 5,357,381 | 10/1994 | Yasuda et al. | 360/53 |
| 5,666,335 | 9/1997 | Horibe | 369/32 |
| 5,751,733 | 5/1998 | Glover | 714/765 |
| 5,844,911 | 12/1998 | Shadegg et al. | 714/710 |

*Primary Examiner*—Hoa T. Nguyen
*Attorney, Agent, or Firm*—Robert E. Bushnell, Esq.

[57] ABSTRACT

A hard disk drive replaces a defective sector with a spare sector. When accessing a track having the defective sector, all normal sectors except for the defective sector are formerly accessed and then, a re-allocation sector which has replaced the defective sector is later accessed. In this manner, the number of searches is reduced during reading/writing (accessing) a track having defectives, thereby improving a data transmission of a hard disk drive.

12 Claims, 6 Drawing Sheets

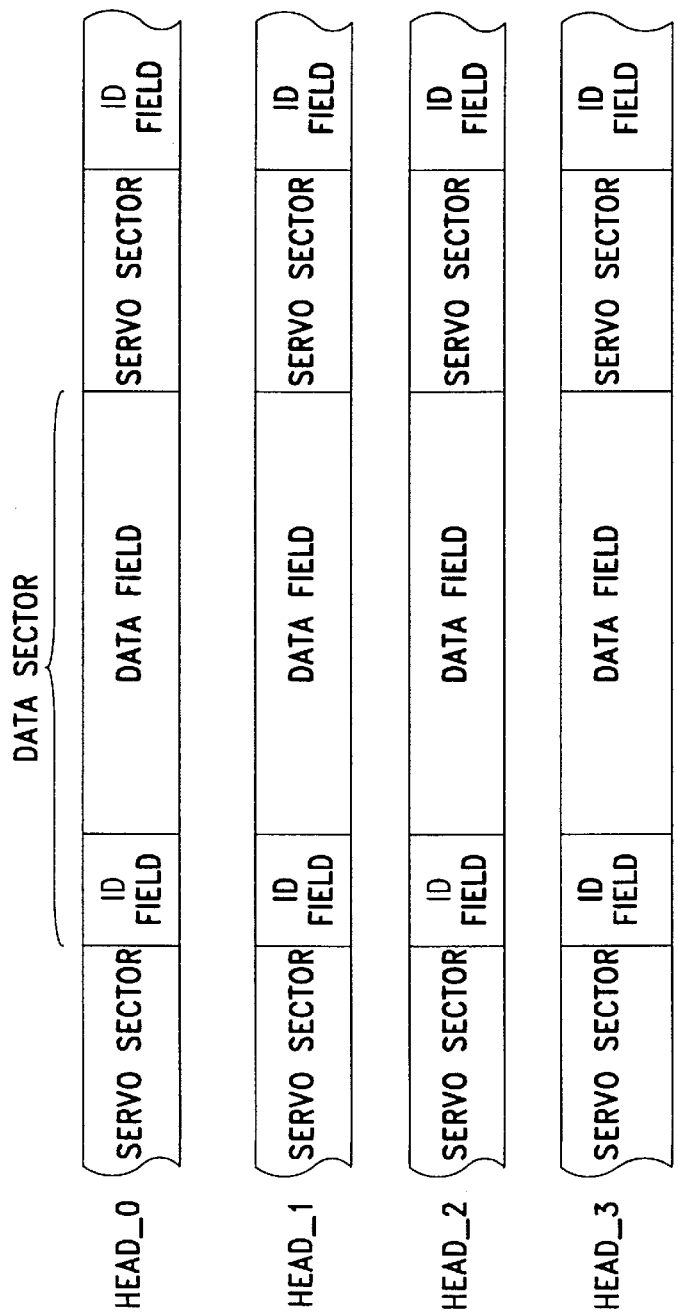
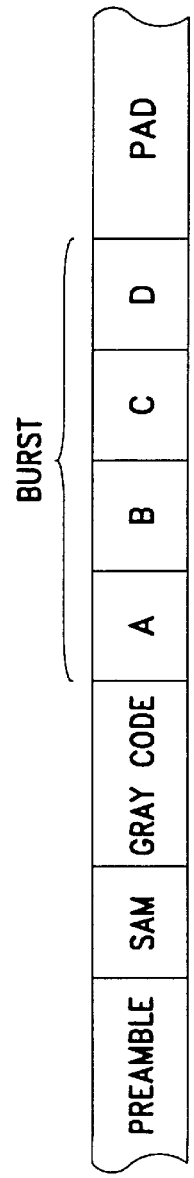
FIG. 3
FIG. 4

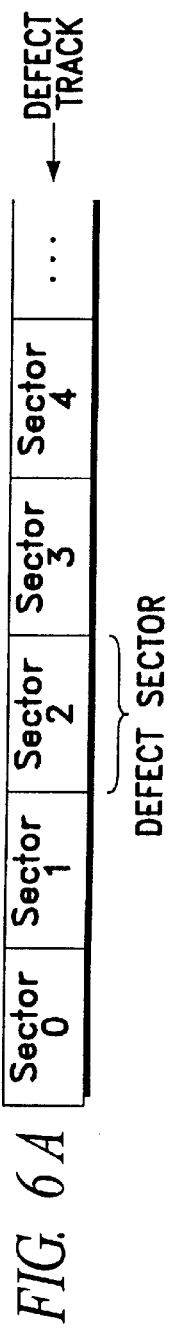
FIG. 6A
FIG. 6B
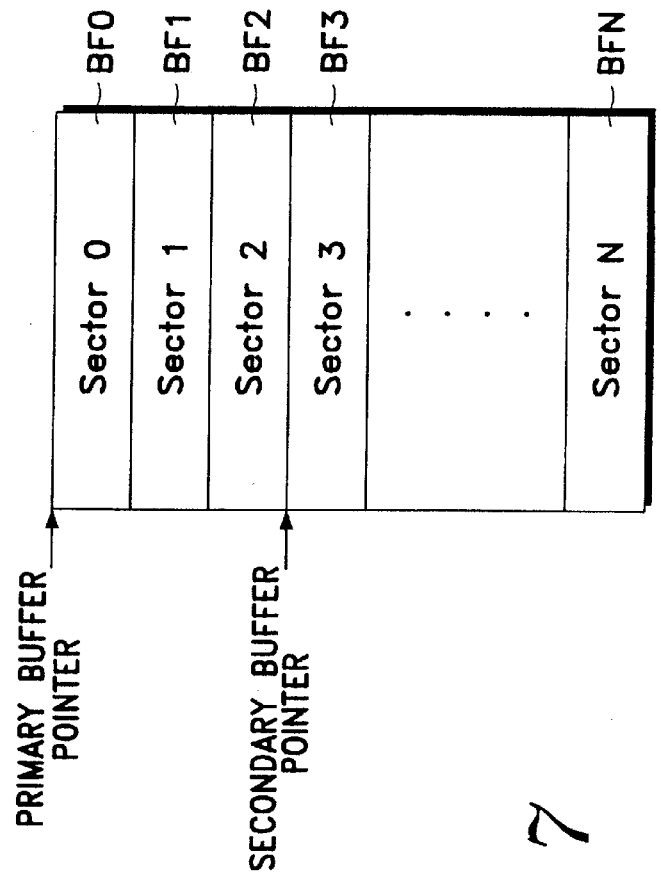
FIG. 7

METHOD FOR IMPROVING ACCESS PERFORMANCE ON TRACK WITH RE-ALLOCATION SECTOR IN A HARD DISK DRIVE

CLAIM FOR PRIORITY

This application makes reference to, incorporates the same herein, and claims all benefits accruing under 35 U.S.C. §119 from an application for METHOD FOR IMPROVING ACCESS PERFORMANCE ON TRACK WITH RE-ALLOCATION SECTOR earlier filed in the Korean Industrial Property Office on Dec. 31, 1996, and there duly assigned Ser. No. 82656/1996, a copy of which application is annexed hereto.

BACKGROUND OF THE INVENTION

1. Technical Field

The present invention relates to a mass storage device such as a hard disk drive, and more particularly to a method for improving a read/write performance on a track having a re-allocation sector in a hard disk drive.

2. Related Art

Hard disk drive (HDD) is widely used as an auxiliary memory device of a computer system because it can access a large amount of data at high speed. Typically, the hard disk drives (HDD) include one or more magnetic disks defining a multiplicity of concentric data tracks. Each data track is divided into alternating data and servo sectors with intersector gaps therebetween. The data sector are used for the storage of main data or user information. The servo sectors are used for the storage of control data such as automatic gain control data, track addresses and tracking servo patterns for use in positioning a head. Magnetic disk drives having high data density generally rely upon servo control systems for moving a selected transducer (head) from a departure track to a destination track location when data information is written or read from the disk.

A typical data sector includes a plurality of identification (ID) regions, data regions and PAD (postamble data) regions serving as intersector gaps therebetween. The servo sector includes a preamble, a servo address mark SAM, a gray code, bursts A, B, C, and D, and a PAD. The preamble, a so-called servo synchronization, provides a clock synchronization during reading the servo information and provides a gap in front of the servo sector to indicate the servo sector. The servo address mark SAM indicates a beginning of the servo sector to provide a synchronization for reading the following gray code. That is, the servo address mark SAM provides a reference point for generating various timing pulses regarding the servo control. The gray code provides track information, i.e., the track number. The bursts A, B, C and D provide a position error signal PES required for the track seek and the track following. The PAD provides a transition margin as a data sector in the servo sector.

When there is a defective sector, the hard disk drive re-allocates a spare sector prepared in the disk for the defect sector. Thereafter, upon receipt of an access command for accessing the defective sectors in a defective track, the hard disk drive searches a defective list in a maintenance area of the disk to check whether the track has a defective sector. If the track has a defective sector, the hard disk drive will access up to a sector preceding the defective and search the re-allocation sector that has replaced the defective sector, to access the re-allocation sector. Thereafter, the hard disk drive moves to the original track to access the next sectors.

Various techniques for allocation replacement of defective sectors in a hard disk drive can be found, for example, in U.S. Pat. No. 4,405,952 for *Apparatus For Detecting Faulty Sectors And For Allocating Replacement Sectors In A Magnetic Disc Memory* issued to Slakmon, U.S. Pat. No. 4,631,723 for *Mass Storage Disk Drive defectiveive Media Handling* issued to Rathbun et al., U.S. Pat. No. 4,706,136 for *Method For Controlling A Magnetic Disk Memory* issued to Wentzel et al., U.S. Pat. No. 4,746,998 for *Method For Mapping Around defectiveive Sectors In A Disc Drive* issued to Robinson et al., U.S. Pat. No. 4,914,530 for *Media defective Management Within Disk Drive Sector Format* issued to Graham et al., U.S. Pat. No. 5,075,804 for *Management Of defective Areas In Recording Media* issued to Deyring, U.S. Pat. No. 5,235,585 for *Reassigning defectiveive Sectors On A Disk* issued to Bish et al., U.S. Pat. No. 5,271,018 for *Method And Apparatus For Media defective Management And Media Addressing* issued to Chan, and U.S. Pat. No. 5,285,436 for *Method Of Avoiding Medium defectives In Record/Reproduce Apparatus* issued to Moribe.

Generally, the contemporary hard disk drive must search for defective sectors every time in order to access the re-allocation sectors corresponding to the defective sectors, so that a data transmission of a host computer may be lowered, which results into a deterioration of the drive performance.

SUMMARY OF THE INVENTION

Accordingly, it is therefore an object of the present invention to provide an improved hard disk drive and process for writing and reading information data on a magnetic disk.

It is also an object to provide a hard disk drive and process with improved defective management to improve a data transmission rate.

It is further an object to provide a method for reducing the number of searches during a read and write operation (accessing) of a track having defective sectors to improve a data transmission of a hard disk drive.

It is another object to provide a memory hard disk and process of providing improved drive performance when accessing a track having defective sectors to improve drive performance.

It is yet another object to provide a hard disk and a process of improving an access performance in a hard disk drive by accessing all normal sectors except for the defective sector and then, accessing a re-allocation sector which has replaced the defective sector, when accessing a track having the defective sector.

These and other objects of the present invention can be achieved by a method for improving data access operation of a hard disk drive by the steps of determining whether a track of a magnetic disk contains a defective sector; when the track of the magnetic disk contains the defective sector, re-allocating the defective sector with a re-allocation sector from a re-allocation area of the magnetic disk; and when the track containing the defective sector is being accessed during one of a read and a write operation, accessing all normal sectors of the track except for the defective sector, and then, accessing the re-allocation sector which has replaced the defective sector to improve data transmission of the hard disk drive.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 3 illustrates a data format of respective tracks on disk surfaces;

FIG. 4 illustrates a servo information pattern written on the servo sector of FIG. 3;

FIGS. 6A and 6B are diagrams for explaining that a defective sector is replaced by a re-allocation sector;

FIG. 7 is a diagram for showing a buffer RAM including buffer pointers according to an embodiment of the present invention.

DETAILED DESCRIPTION OF THE PREFERRED EMBODIMENT

Figure 1:
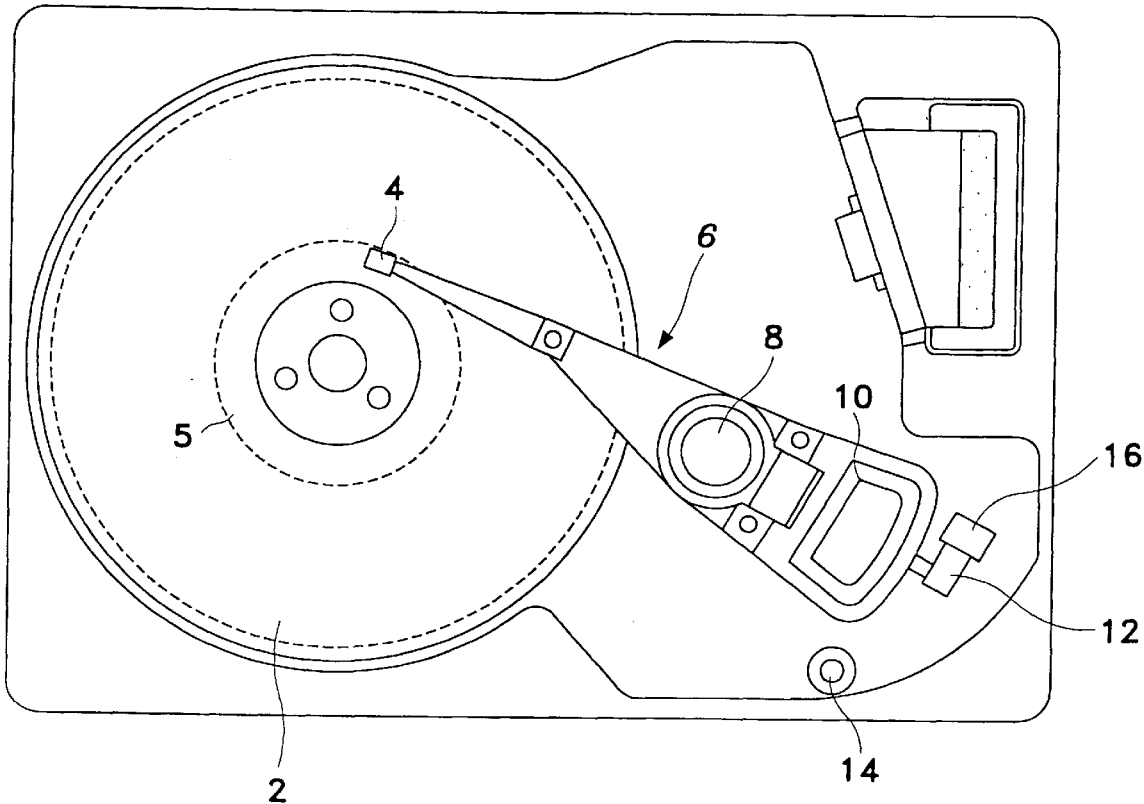
FIG. 1 illustrates a common hard disk drive assembly.
Figure 2:
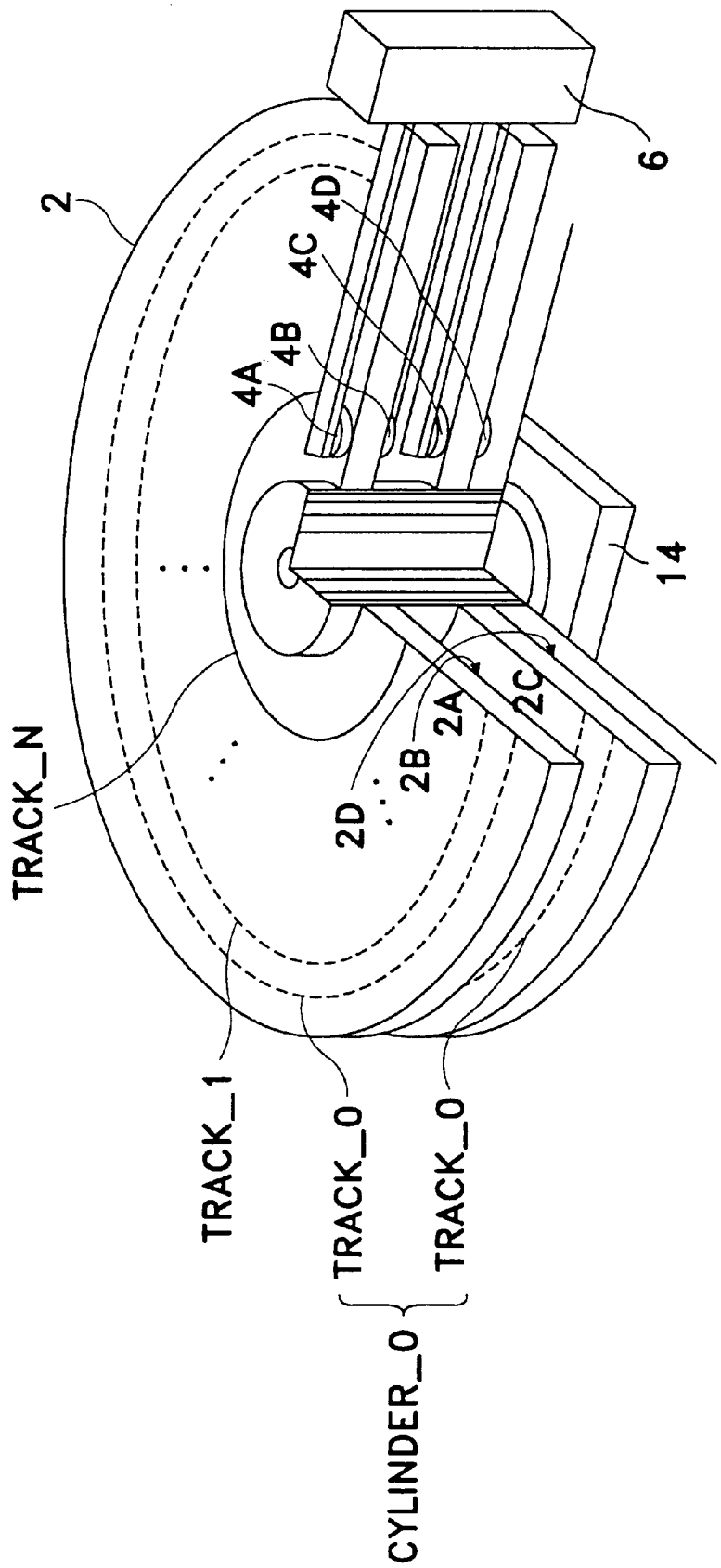
FIG. 2 is a partial cross-sectional diagram of multiple disks in a hard disk drive.

Referring now to the drawings and particularly to FIGS. 1 and 2, which illustrates a common hard disk drive assembly supporting multiple disks. As shown in FIG. 1, the hard disk drive is constructed with a generally, rectangularly shaped base serving as a frame providing a major interior surface accommodating a plurality of information storage disks 2 coaxially mounted in a stack upon a spindle hub assembly 5 driven by a motor (not shown) mounted on base to provide a plurality of cylindrical base surfaces that serve as a memory into which binary information data may be written and read, an actuator 6 mounted upon base, a voice coil motor 10 positioned to respond to electrical control signals and thereby arcuately displace a proximal end of actuator 4, and a multi-lead flexible ribbon cable electrically coupling arm with the corresponding terminal pins of terminal. Actuator arm supports, at its distal end, a plurality of electromagnetic transducers commonly known as read/write actuator heads 4 corresponding to the distinct separate cylindrical base surfaces of disks 2 that serves as memories. In the embodiment of the disk drive chosen for the purpose of illustration, two information storage disks are utilized. The information storage disks 2 include a first storage disk with top and bottom surfaces 2A and 2B and a second storage disk with top and bottom surfaces 2C and 2B as shown in FIG. 2. The spindle motor assembly 14 includes a non-rotating spindle shaft (not shown) that is securely fastened to the base.

A disk 2 on which information data transferred from a host computer is magnetically written, revolves at a constant speed. The transducer head 4 mounted on a distal end of the actuator 6 floats, at a particular interval, on a surface of the disk 2 which revolves at a constant speed, so as to read and write information data. An iron piece 12 is attached to another end of the actuator 6. The actuator 6 is supported by a pivot bearing 8 and includes a coil 10 of a voice coil motor which is mounted between the pivot bearing 8 and the iron piece 12. The actuator 6 revolves on an axis of the pivot bearing 8 by the voice coil motor, to radially move with respect to the disk 2. An outer crash stop 14 is mounted on base to prevent the head 4 from getting out of the disk 2. A magnet 16 (sometimes, called a inner crash stop) contacts with the iron piece 12 attached on another end of the actuator 6 by a magnetic force in case of nonuse of the hard disk drive, so as to fix the actuator 6.

FIG. 2 illustrates a partial cross-sectional diagram of the disks in a hard disk drive adopting a multi-platter technique. The multi-platter is adopted for maximizing a data storage capacity. As shown in FIG. 2, two sheets of the disks 2 are mounted on a driving axle of a spindle motor 14. Four heads 4A to 4D attached on arms extending horizontally from the actuator 6 are placed on surfaces 2A to 2D of the disks 2, respectively. Each of the disk surfaces 2A to 2D has a plurality of tracks formed thereon along concentric circles, and the respective tracks have track numbers TRACK_0-TRACK_N assigned thereto. The tracks of the respective disk surfaces 2A to 2D having the same track numbers are commonly called a cylinder. Therefore, the same track numbers of the respective disk surfaces are defined by the cylinder numbers. For example, a cylinder number CYLINDER_0 is assigned to all the tracks having the same track number TRACK_0 of the respective disk surfaces 2A to 2D.

The hard disk drive selectively places the heads on any one of the tracks on the disks by a servo mechanism. Placing a head on a particular track is achieved by two steps of servo control modes such as a track seek and a track following. The track seek is a step for moving the head from a current track to a target track and is called a seek mode. The track following is a step for accurately following a sought track and is called a following mode. Once the head is placed on a track, the head should continue to follow a center line of the track in order to perform an accurate read/write operation. For the track seek, the track following, and the data write operations, tracks on the disk surfaces have a data format as shown in FIG. 3, in which servo sectors and data sectors are alternately arranged. Further, FIG. 4 illustrates a servo pattern written in the servo sector of FIG. 3.

Referring to FIG. 3, the respective tracks corresponding to the heads HEAD_0–HEAD_3 have the servo sectors and the data sectors written thereon alternately. The servo sectors are prepared for a servo control such as the track seek and track following, and the data sectors are prepared for recording user data thereon.

FIG. 3 illustrates, by way of example, a sector format for four tracks formed on the same cylinder of the disks corresponding to the respective heads in a hard disk drive including two sheet of the disks. As shown in FIG. 3, the data sector commonly includes an ID (identification) field on which header information for discriminating data sector is written, and a data field on which digital data is written. The servo sectors are placed in front and rear of the data sector.

FIG. 4 illustrates servo information written on the servo sector. The servo sector includes a preamble, a servo address mark SAM, a gray code, bursts A, B, C, and D, and a PAD. The preamble, a so-called servo synchronization, provides a clock synchronization during reading the servo information and provides a gap in front of the servo sector to indicate the servo sector. The servo address mark SAM indicates a beginning of the servo sector to provide a synchronization for reading the following gray code. That is, the servo address mark SAM provides a reference point: for generating various timing pulses regarding the servo control. The gray code provides track information, i.e., the track number.

The bursts A, B, C and D provide a position error signal PES required for the track seek and the track following. The PAD provides a transition margin as a data sector in the servo sector.

Figure 5:
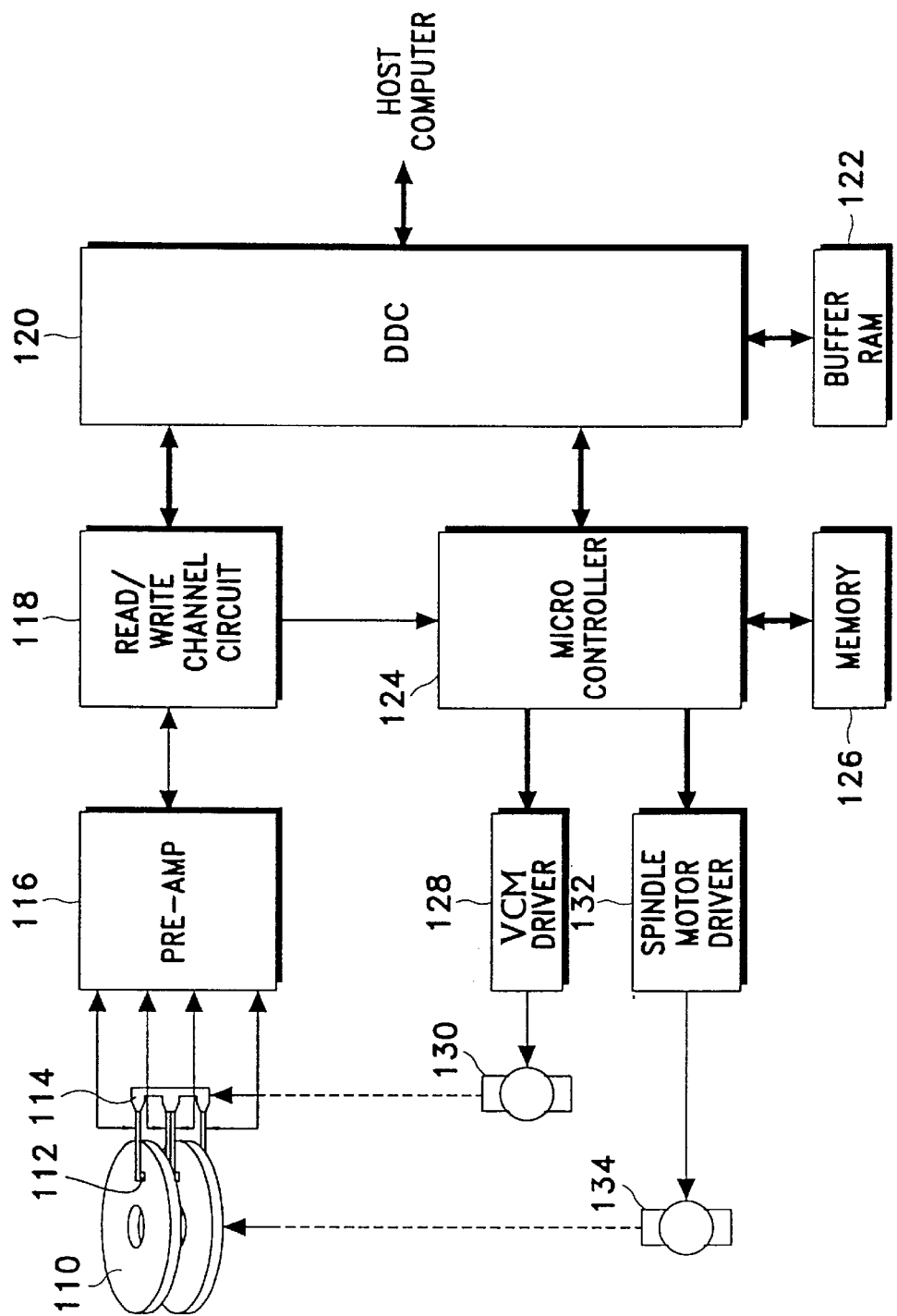
FIG. 5 is a system block diagram of a common hard disk drive with multiple disks.
Figure 8:
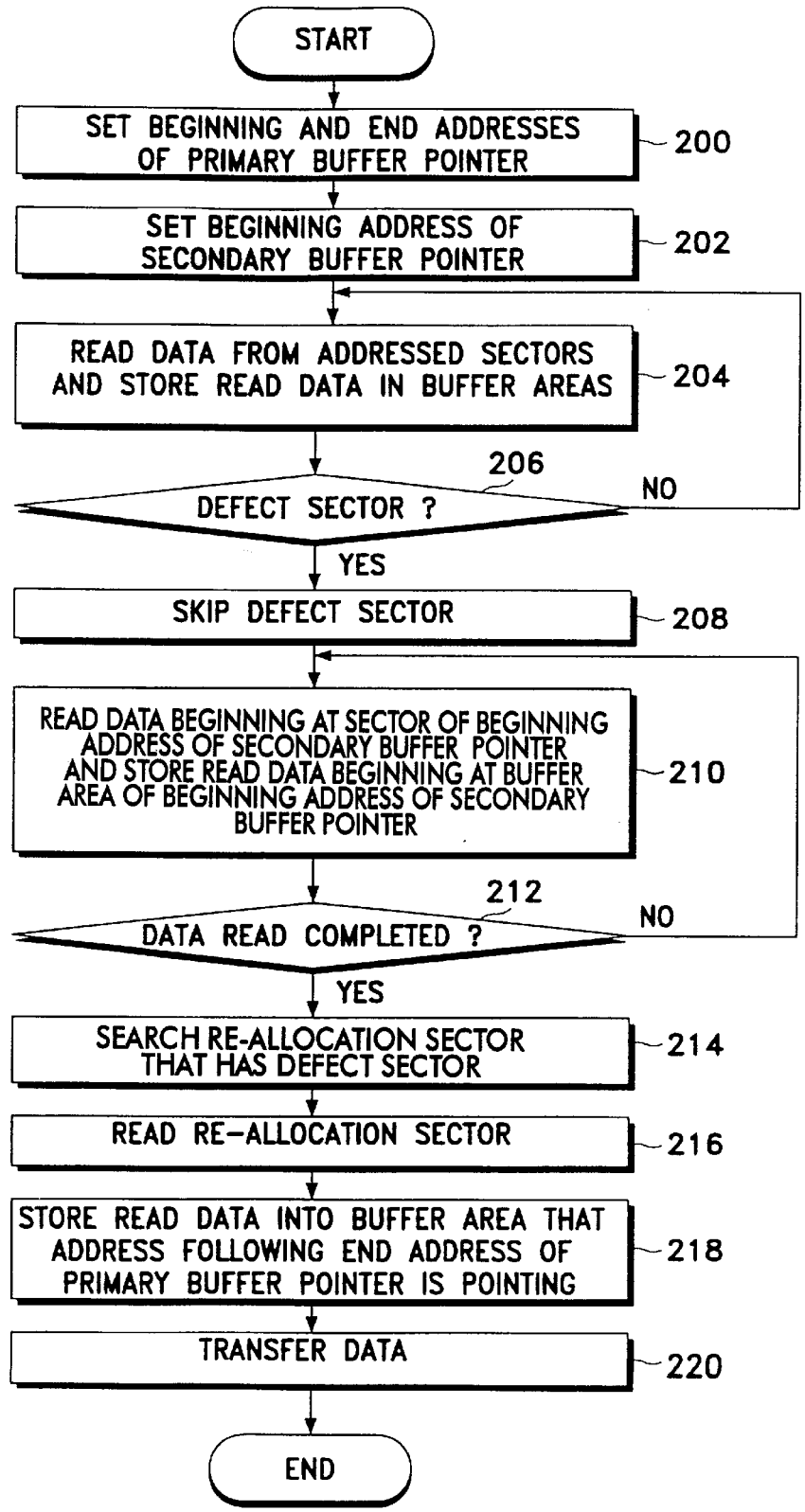
FIG. 8 is a flow chart of a process of accessing a track having defectives according to an embodiment of the present invention.

Turning now to FIG. 5, which illustrates a high density hard disk drive HDD constructed according to the principles of the present invention. The HDD includes, for example, two magnetic disks 110 and corresponding four transducer heads 112, a transducer head assembly 114 in an E-shape having actuator arms each for supporting a respective pair of transducer heads 112, a preamplifier 116, a read/write channel circuit 118, a disk data controller (DDC) 120, a buffer random-access-memory (RAM) 122, a micro-controller 124, a memory 126, a VCM (voice coil motor) driver 128, a voice coil motor 130, a spindle motor driver 132, a spindle motor 134 for rotating the magnetic, head 112 across the surface of the disk 110.

Preamplifier 116 is electrically connected to the transducer head assembly 114 for amplifying a predetermined signal read out from the disk 110 using the transducer head 112 and transmitting the amplified signal to the read/write channel circuit 118. For the purpose of writing data onto the disk 110, the preamplifier 116 applies encoded writing data transmitted from the read/write channel circuit 118 to a designated transducer head from the magnetic heads 112 to be recorded on the disk 110. At this time, the preamplifier 116 selects one of the magnetic heads 112 according to a control signal generated from a disk data controller (DDC) 120 under the instruction of a micro-controller 124.

Read/write channel circuit 118 is connected between the preamplifier 116 and the DDC 120 for decoding data pulses from an input signal received from the preamplifier 116 to generate read-out data, and for decoding writing data received from the DDC 120 to transmit the decoded data to the preamplifier 116. The read/write channel circuit 118 generates a position error signal (PES) by decoding head position information, i.e., a part of servo information, which is recorded on the disk, and transmits the same to the micro-controller 124.

The DDC 120 is controlled by the micro-controller 124 to record the data received from a host computer via the read/write channel circuit 118 and the preamplifier 116 or to transmit the data read out from the disk 110 to the host computer. The buffer RAM 122 temporarily stores data being transferred among the host computer, the micro-controller 124, and the read/write channel circuit 118. The micro-controller 124 controls the track seek and the track following in response to a read or write command received from the host computer. The memory 126 stores an execution program of the micro-controller 124 and various setting values. The VCM driver 128 generates a driving current for driving the actuator 130 in response to a head position control signal generated from the micro-controller 124. The driving current generated from the VCM driver 128 is applied to the actuator 130. The actuator 130 moves the heads 112 on the disks 110 according to a direction and level of the driving current received from the VCM driver 128. A spindle motor driver 132 drives the spindle motor 134 according to a disk revolution control signal generated from the micro-controller 124.

Generally, when there is a defective sector generated under a user environment, the contemporary hard disk drive re-allocates a spare sector prepared in the disk for the defective sector. Thereafter, upon receipt of an access command for accessing the defective sectors in a defective track, the hard disk drive searches a defective list in a maintenance area of the disk to check whether the track has a defective sector or not. If the track has a defective sector, the hard disk drive will access up to a sector preceding the defective and search the re-allocation sector that has replaced the defective sector, to access the re-allocation sector. Thereafter, the hard disk drive moves to the original track to access the next sectors. Consequently, the contemporary hard disk drive must search the defective sectors every time in order to access the re-allocation sectors corresponding to the defective sectors, that a data transmission throughput to the host computer may be lowered, which results into a deterioration of the drive performance.

If the hard disk drive has a defective sector under the user environment, the defective sector will be replaced by a spare sector prepared in the disk. With reference to FIG. 6, if a sector 2 has a defect as shown in FIG. 6A, the hard disk drive will re-allocate the defective sector 2 with a spare sector in the re-allocation area shown in FIG. 6B. The hard disk drive according to the present invention establishes buffer pointers as shown in FIG. 7, in order to reduce the number of searching operations, in case of the defective sector, thereby to improve the data transmission throughput of the disk drive.

Referring to FIG. 7, there is illustrated a diagram for showing a status of buffer pointers in the buffer RAM 122 when starting a data access sequence in the track having the sector as shown in FIGS. 6A and 6B. As shown in FIG. 7, a primary buffer pointer and a secondary buffer pointer are set so as to access all the sectors except for the defective sector in the track. Upon beginning of the data access sequence, the primary buffer pointer is set so as to point a buffer area BF0 corresponding to a first sector out of the object sectors, and the secondary buffer pointer is set so as to point a buffer area BF3 corresponding to a sector which is placed just after the defective sector 2. Further, a start address and an end address of the primary buffer pointer are set.

Now, the operation of reading data from a sector in a track and transferring the data to the host computer will be described in detail with reference to FIGS. 5 through 8.

At step 200, the micro-controller 124 interfaces with the disk data controller 120, to set a primary buffer pointer, and the start address and the end address of the primary buffer pointer in the buffer RAM 122. With reference to FIGS. 6 and 7, the start address of the primary buffer pointer is set to the buffer area BF0 in which data of the sector 0 is to be stored, and the end address is set to the buffer area BF1 in which data of the sector 1 is to be stored. Thereafter, at step 202, the micro-controller 124 interfaces with the disk data controller 120 to set a secondary buffer pointer, and set the start address of the secondary buffer pointer to a buffer area of a sector which is placed just after the defective sector. That is, the start address of the secondary buffer pointer is set to the buffer area BF3 in which data of the sector 3 is to be stored.

Then, at step 204, the micro-controller 124 reads data from the sectors 0 and 1 according to the addresses that the primary buffer pointer has set, and stores the read data into the buffer areas BF0 and BF1 of the buffer RAM 122 by way of the disk data controller 120. Then the micro-controller 124 checks, at step 206, whether the sector from which the data has been read is a defective sector. If the sector is the defective sector, the defective sector will be skipped at step 208. At step 210, the micro-controller 124 reads data beginning at the sector of the current track corresponding to the start address of the secondary buffer pointer, and stores the read data beginning at the buffer area BF3 of the start address that the secondary buffer pointer points.

The micro-controller 124 then checks, at step 212, whether the data is completely read or not. If the data is completely read, the micro-controller 124 searches the re-allocation sector that has replaced the defective sector, i.e., the sector 2 at step 214, and reads the re-allocation sector at step 216. Thereafter, at step 218, the micro-controller 124 stores the data read from the re-allocation sector into the buffer area BF2 that an address following the end address of the primary buffer pointer is pointing. Thereafter, the micro-controller 124 transfers all the data stored in the buffer RAM 122 to the host computer, at step 220.

Meanwhile, in case that the write data from the host computer is stored in the buffer RAM 122, the micro-controller 124 will perform an operation opposite to the described data read operation. That is, the data in the buffer area that the primary buffer pointer points to is written on the sectors of the corresponding track, and the data in the buffer area that the secondary buffer pointer points to is written on the sectors of the corresponding track. Of course, the defective sector on the track is skipped while the primary buffer pointer goes over the secondary buffer pointer. Thereafter, the data in the buffer area of an address following the end address that the primary buffer pointer points to is written on the re-allocation sector. The track seek is performed prior to writing the data on the re-allocation sector.

As described in the foregoing, the hard disk drive of the invention reduces the number of searches during reading/writing (accessing) a track having defectives, to improve a data transmission throughput of a drive so that the drive performance may be improved. In particular, the present invention may be effective for a hard disk drive which has relatively many defective sectors.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof Therefore, it is intended that the present invention not be limited to the particular embodiment disclosed as the best mode contemplated for carrying out the present invention, but that the present invention includes all embodiments falling within the scope of the appended claims.

What is claimed is:

1. A method for improving data access operation of a hard disk drive, comprising the steps of:
    determining whether a track of a recording medium written on and read by said hard disk drive contains a defective sector;
    when the track of the recording medium contains said defective sector, re-allocating said defective sector with a re-allocation sector from a re-allocation area of said recording medium;
    identifying as normal sectors any sector of the recording medium that is not determined to be a defective sector;
    using a primary buffer pointer and a secondary buffer pointer within a memory of said hard disk drive to access all normal sectors of the recording medium, by using said primary buffer pointer to access all sectors of the recording medium preceding said defective sector and using said secondary buffer pointer to access all sectors of the recording medium following said defective sector; and
    when the track containing said defective sector is being accessed during one of a read and a write operation, accessing all normal sectors of said track except for said defective sector, and then, accessing said re-allocation sector and replacing said defective sector.

2. The method of claim 1, wherein said primary buffer pointer has a start address and an end address of buffer areas in said buffer memory, said end address corresponding to the sector preceding said defective sector.

3. The method of claim 1, wherein said buffer memory has buffer areas for storing addresses of sectors of a current track of said hard disk drive.

4. The method of claim 1, further comprising the steps of:
    transferring data, during the read operation, from the normal sectors and sequentially storing by address to a buffer memory while skipping an address of said buffer memory corresponding to said defective sector and then transferring data from said re-allocation sector to the skipped address of said buffer memory; and
    sequentially transferring by address during the read operation all data stored in said blluffer memory to a host computer.

5. The method of claim 4, further comprising the steps of:
    transferring data during the write operation, from the host computer to said buffer memory, said buffer memory storing data sequentially by address;
    writing the data stored in said buffer memory to the corresponding normal sectors of a track while skipping the buffer memory corresponding to said defective sector and then writing the buffer memory corresponding to said defective sector to said reallocation sector; and
    verifying that the writing of the data to said hard disk drive is completed.

6. A method for allocating defective sectors in a disk drive, comprising:
    using a buffer memory with buffer areas for storing address data of sectors of a current track of a recording medium, and using primary and secondary buffer pointers to address sectors of the current track of said recording medium;
    setting said primary buffer pointer with a starting address and an ending address of buffer areas in said buffer memory;
    setting said secondary buffer pointer with a starting address of a designated buffer area in said buffer memory corresponding to a sector following a defective sector of the current track;
    reading information data from the sector of the current track set in accordance with the starting address and the ending address of said primary buffer pointer;
    determining whether the sectors from which the information data is read contain a defective sector;
    when the sector from which the information data is read is a defective sector, skipping said defective sector;
    reading information data from the sector of the current track set in accordance with the starting address of said secondary buffer pointer, and storing read data beginning at said designated area of said buffer memory;
    searching a re-allocation sector that has replaced said defective sector;
    reading information data from the re-allocation sector, and storing read data in a buffer area that an address following the ending address of said primary buffer pointer is set; and transferring all information data stored in said buffer memory to a host computer.

7. The method of claim 6, further comprising the steps of:

transferring information data from said host computer to said buffer memory;

writing the information data stored on said buffer memory to the sector of a track in accordance with the starting address and the end address of said primary buffer pointer;

when the end address of said primary buffer pointer is reached, the next buffer area corresponding to said defective sector is skipped;

writing the information data to the sector of a track in accordance with the starting address of the secondary buffer pointer;

verifying that the writing of information to said recording medium is completed;

searching a re-allocation sector that has replaced said defective sector; and writing the information data from a buffer area of said buffer memory to the re-allocation sector, the buffer area of said buffer memory corresponding to the address following the end address of said primary buffer pointer.

8. The method of claim 6, further comprising the step of verifying the completion of the data read after reading information data from the sector of the current track set in accordance with the starting address of said secondary buffer pointer.

9. A hard disk drive, comprising:

a magnetic disk having a plurality of concentric tracks with sectors;

a head accommodating reading and writing data transferred from a host computer from/to said magnetic disk;

a buffer memory with buffer areas accommodating storing address data of sectors of a current track of said magnetic disk, and primary and secondary buffer pointers to address sectors of the current track of said magnetic disk; and a controller accommodating controlling data read and write operations and minimizing the number of searches of tracks containing defective sectors during said data read and write operations by:

determining whether a track of a recording medium contains a defective sector;

when the track of the recording medium contains said defective sector, re-allocating said defective sector with a re-allocation sector from a re-allocation area of said magnetic disk; and when the track containing said defective sector is being accessed during one of said data read and write operation, controlling said primary and secondary buffer pointers to access all normal sectors of said track except for said defective sector, and then, access said re-allocation sector which has replaced said defective sector to improve data transmission of said hard disk drive.

10. A method, comprising the steps of:

setting a primary pointer with a starting address and an end address of buffer areas in a memory of a recording medium;

setting a secondary pointer with a starting address of a designated buffer area in said memory corresponding to a sector following a defective sector of a current track of said recording medium;

transferring information data from a computer to said memory;

writing the information data stored on said memory to a sector of a track in accordance with the starting address and the end address of said primary pointer;

when the end address of said primary pointer is reached, the next buffer area corresponding to said defective sector is skipped;

after skipping said defective sector, writing the information data to the sector of a track in accordance with the starting address of the secondary pointer;

searching for a re-allocation sector that has replaced said defective sector; and writing the information data from a buffer area of said memory to said re-allocation sector, the buffer area of said memory corresponding to the address following the end address of said primary pointer.

11. The method of claim 10, further comprising the step of verifying that the writing of information data to said recording medium is completed after writing information data from the sector of the current track set in accordance with the starting address of said secondary pointer.

12. The method of claim 11, wherein writing the information data stored on said memory to the sector of a track is controlled by a controller unit of said recording medium.

* * * * *